US012302458B2

(12) United States Patent
Krietzman

(10) Patent No.: US 12,302,458 B2
(45) Date of Patent: May 13, 2025

(54) PORTABLE NON-COMBUSTION VAPORIZER FOR TOBACCO CONSUMABLES

(71) Applicant: Mark Krietzman, Palos Verdes Estates, CA (US)

(72) Inventor: Mark Krietzman, Palos Verdes Estates, CA (US)

( * ) Notice: Subject to any disclaimer, the term of this patent is extended or adjusted under 35 U.S.C. 154(b) by 0 days.

(21) Appl. No.: 18/621,058

(22) Filed: Mar. 28, 2024

(65) Prior Publication Data

US 2024/0276600 A1 Aug. 15, 2024

Related U.S. Application Data

(63) Continuation of application No. 18/133,991, filed on Apr. 12, 2023, now Pat. No. 11,979,949, which is a continuation of application No. 17/211,721, filed on Mar. 24, 2021, now Pat. No. 11,647,566, and a continuation-in-part of application No. 17/147,030,
(Continued)

(51) Int. Cl.

| | |
|---|---|
| ***A24F 40/50*** | (2020.01) |
| ***A24B 15/16*** | (2020.01) |
| ***A24F 40/40*** | (2020.01) |
| ***A24F 40/42*** | (2020.01) |
| ***A24F 40/46*** | (2020.01) |
| ***H05B 1/02*** | (2006.01) |
| ***H05B 3/14*** | (2006.01) |

(Continued)

(52) U.S. Cl.
CPC ........... *H05B 1/0244* (2013.01); *A24B 15/16* (2013.01); *A24F 40/40* (2020.01); *A24F 40/42* (2020.01); *A24F 40/46* (2020.01); *A24F 40/50* (2020.01); *H05B 1/0225* (2013.01); *H05B 3/146* (2013.01); *H05B 3/42* (2013.01); *A24F 40/60* (2020.01); *H05B 2203/014* (2013.01); *H05B 2203/021* (2013.01); *H05B 2203/022* (2013.01)

(58) Field of Classification Search
None
See application file for complete search history.

(56) References Cited

U.S. PATENT DOCUMENTS

| | | | |
|---|---|---|---|
| 4,947,874 | A | 8/1990 | Brooks et al. |
| 4,947,875 | A | 8/1990 | Brooks et al. |

(Continued)

FOREIGN PATENT DOCUMENTS

| | | |
|---|---|---|
| CN | 1541577 | 11/2004 |
| CN | 101518361 | 9/2009 |

(Continued)

*Primary Examiner* — Ross N Gushi
(74) *Attorney, Agent, or Firm* — Mark H. Krictzman

(57) ABSTRACT

Heating a consumable containing tobacco (or other plant material) without combustion to release smoke free vapors. A consumable having one or more deformable frangible sections is insertable into a chamber in a heating device with at least temperature controlled heating. During insertion of the consumable into the device, a protrusion deforms a frangible section(s) of the consumable which forms an air gap in a separation between the deformed section of the consumable and the chamber's inner wall. A controller receiving temperature sensor(s) input controls the supply of power to heating elements in thermal communication with the chamber thereby heating the consumable.

15 Claims, 10 Drawing Sheets

Related U.S. Application Data filed on Jan. 12, 2021, now Pat. No. 11,770,877, which is a continuation of application No. 16/410,858, filed on May 13, 2019, now Pat. No. 10,893,707, said application No. 17/211,721 is a continuation of application No. 16/118,244, filed on Aug. 30, 2018, now Pat. No. 10,986,872, said application No. 16/410,858 is a continuation-in-part of application No. 15/898,629, filed on Feb. 18, 2018, now Pat. No. 10,299,515, said application No. 16/118,244 is a continuation of application No. 15/045,410, filed on Feb. 17, 2016, now Pat. No. 10,076,137, said application No. 15/898,629 is a continuation-in-part of application No. 15/045,442, filed on Feb. 17, 2016, now Pat. No. 9,894,936.

(60) Provisional application No. 62/270,557, filed on Dec. 21, 2015, provisional application No. 62/208,786, filed on Aug. 23, 2015, provisional application No. 62/184,396, filed on Jun. 25, 2015, provisional application No. 62/127,817, filed on Mar. 3, 2015, provisional application No. 62/116,926, filed on Feb. 17, 2015.

(51) Int. Cl.

| | |
|---|---|
| ***H05B 3/42*** | (2006.01) |
| *A24F 40/60* | (2020.01) |

(56) References Cited

U.S. PATENT DOCUMENTS

| | | | | |
|---|---|---|---|---|
| 5,144,962 | A | 9/1992 | Counts et al. | |
| 5,249,586 | A * | 10/1993 | Morgan | A24F 40/46 131/194 |
| 5,269,327 | A | 12/1993 | Counts et al. | |
| 5,388,594 | A | 2/1995 | Counts et al. | |
| 5,530,225 | A | 6/1996 | Hajaligol | |
| 5,649,554 | A | 7/1997 | Sprinkel et al. | |
| 5,692,525 | A | 12/1997 | Counts et al. | |
| 5,708,258 | A | 1/1998 | Counts et al. | |
| 5,954,979 | A | 9/1999 | Counts et al. | |
| 6,155,268 | A | 12/2000 | Takeuchi | |
| 6,516,796 | B1 | 2/2003 | Cox et al. | |
| 7,185,659 | B2 | 3/2007 | Sharpe | |
| 9,032,968 | B2 | 5/2015 | Glasberg et al. | |
| 9,084,440 | B2 | 7/2015 | Zuber et al. | |
| 9,259,035 | B2 | 2/2016 | Terry et al. | |
| 9,271,526 | B2 | 3/2016 | Liu | |
| 9,414,629 | B2 | 8/2016 | Egoyants et al. | |
| 9,451,791 | B2 | 9/2016 | Sears | |
| 9,468,234 | B2 * | 10/2016 | Fernando | G06V 30/2253 |
| 9,510,623 | B2 | 12/2016 | Tucker et al. | |
| 9,516,899 | B2 | 12/2016 | Plojoux et al. | |
| 9,532,603 | B2 | 1/2017 | Plojoux et al. | |
| 9,609,894 | B2 | 4/2017 | Abramov et al. | |
| 9,675,117 | B2 | 6/2017 | Li et al. | |
| 9,775,380 | B2 | 10/2017 | Fernando et al. | |
| 9,826,780 | B2 | 11/2017 | Krietzman | |
| 9,854,841 | B2 | 1/2018 | Ampolini et al. | |
| 10,028,533 | B2 * | 7/2018 | Fursa | A24F 40/53 |
| 10,076,137 | B2 | 9/2018 | Krietzman | |
| 10,130,780 | B2 | 11/2018 | Talon | |
| 10,238,764 | B2 | 3/2019 | Trzecieski | |
| 10,299,515 | B2 | 5/2019 | Krietzman | |
| 10,785,198 | B2 | 9/2020 | Pahl et al. | |
| 10,885,734 | B2 | 1/2021 | Schoenfelder et al. | |
| 10,982,899 | B1 | 4/2021 | Gelardi | |
| 11,007,546 | B2 | 5/2021 | Hohmann et al. | |
| 11,033,056 | B2 | 6/2021 | Gill et al. | |
| 11,457,667 | B2 | 10/2022 | Krietzman | |
| 2002/0179179 | A1 | 12/2002 | Volpenheim et al. | |
| 2004/0089314 | A1 | 5/2004 | Felter et al. | |
| 2007/0074734 | A1 | 4/2007 | Braunshteyn et al. | |
| 2013/0218066 | A1 | 8/2013 | Duquet et al. | |
| 2014/0014124 | A1 | 1/2014 | Glasberg et al. | |
| 2014/0097207 | A1 | 4/2014 | Szymiczek et al. | |
| 2014/0202476 | A1 | 7/2014 | Egoyants et al. | |
| 2014/0366898 | A1 | 12/2014 | Monsees et al. | |
| 2015/0040929 | A1 | 2/2015 | Hon | |
| 2015/0150308 | A1 | 6/2015 | Monsees et al. | |
| 2015/0284177 | A1 | 10/2015 | Patil et al. | |
| 2015/0305406 | A1 | 10/2015 | Li et al. | |
| 2015/0306617 | A1 | 10/2015 | Olegnowicz | |
| 2015/0342257 | A1 | 12/2015 | Chen | |
| 2016/0198771 | A1 | 7/2016 | Goggin et al. | |
| 2016/0235124 | A1 | 8/2016 | Krietzman | |
| 2016/0255879 | A1 | 9/2016 | Paprocki et al. | |
| 2016/0278436 | A1 | 9/2016 | Verleur et al. | |
| 2016/0331033 | A1 | 11/2016 | Hopps et al. | |
| 2017/0055580 | A1 * | 3/2017 | Blandino | A24F 40/465 |
| 2017/0108210 | A1 | 4/2017 | Meinhart et al. | |
| 2017/0119051 | A1 | 5/2017 | Blandino et al. | |
| 2017/0156407 | A1 | 6/2017 | Abramov et al. | |
| 2017/0215478 | A1 | 8/2017 | Harrison et al. | |
| 2017/0360092 | A1 | 12/2017 | Althorpe et al. | |
| 2018/0030974 | A1 | 2/2018 | Cosgarea | |
| 2018/0085551 | A1 | 3/2018 | Krietzman | |
| 2018/0140001 | A1 | 5/2018 | Gabbay | |
| 2019/0195852 | A1 | 6/2019 | Bryant, Jr. et al. | |
| 2019/0373679 | A1 | 12/2019 | Fu et al. | |
| 2020/0138117 | A1 | 5/2020 | Rosser et al. | |
| 2020/0156826 | A1 | 5/2020 | Kilduff et al. | |
| 2020/0377280 | A1 | 12/2020 | Pace et al. | |
| 2021/0346616 | A1 | 11/2021 | Krietzman | |
| 2021/0401061 | A1 | 12/2021 | Davis et al. | |
| 2023/0232886 | A1 | 7/2023 | Robinson et al. | |

FOREIGN PATENT DOCUMENTS

| | | |
|---|---|---|
| CN | 101606758 | 12/2009 |
| CN | 201379072 | 1/2010 |
| CN | 204393344 | 6/2015 |
| JP | 3164992 | 12/2010 |

* cited by examiner

Zones BB
Zones AA
zone A
zone B
"G"
500
1000

PORTABLE NON-COMBUSTION VAPORIZER FOR TOBACCO CONSUMABLES

RELATED APPLICATIONS

This application is a continuation of U.S. patent application Ser. No. 18/133,991 filed Apr. 12, 2023 which is a continuation in part of U.S. Pat. No. 11,770,877 (Ser. No. 17/147,030) filed Jan. 12, 2021, and entitled "PORTABLE TEMPERATURE CONTROLLED AROMATHERAPY VAPORIZERS" which is a continuation in part of U.S. Pat. No. 10,893,707, filed May 13, 2019 entitled "Portable Temperature Controlled Aromatherapy Vaporizers "which is a continuation of U.S. Pat. No. 10,299,515, filed Feb. 18, 2018 entitled "Dynamic Zoned Vaporizer" which is a continuation in part of U.S. Pat. No. 9,894,936, filed Feb. 16, 2016 and entitled "Zoned Vaporizer" U.S. Pat. No. 9,894,936 which claims the benefit of U.S. Provisional Patent Application Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

This application is also a continuation of U.S. patent application Ser. No. 18/133,991 filed Apr. 12, 2023 which is a continuation of U.S. patent application Ser. No. 17/211,721, filed Mar. 24, 2021, and entitled "VAPORIZERS WITH CARTRIDGES WITH OPEN SIDED CHAMBER" which is a continuation of U.S. Pat. No. 10,986,872, filed Aug. 30, 2018 entitled "VAPORIZER AND VAPORIZER CARTRIDGES" which is a continuation of U.S. Pat. No. 10,076,137, filed Feb. 17, 2016 entitled "VAPORIZER AND VAPORIZER CARTRIDGES" which claims the benefit of U.S. Provisional Patent Application Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

BACKGROUND OF THE DISCLOSURE

Field of the Disclosure

The present disclosure relates generally to heating without burning of a smokeless disposable cartridges containing vaporizable oils, compounds and/or other plant-based material which upon appropriate zoned heating controllably releases vapor.

Related Art

Vaporizer for plant-based materials and/or essential oils is known. Vaporizers which allow a fluid gas containing the vapor and other residues to follow a fluid pathway from source of vapor to user inhalation exist. *Cannabis*, hemp, tobacco and other botanicals have been known in the art to be vaporized or burned to release organic material in the form of inhalable material. Vaporizing at correct temperatures can boil off the oils for inhalation without combusting the plant material.

Vaporizer for plant-based materials and essential oils and exist. Vaporizers allow aromatherapy or inhalation. Vaporizers which allow inhalation from a fluid pathway whereby gas containing the vapor without combustion by products through a fluid pathway from source of vapor to exists. Herbs and botanicals have been known in the art to be vaporized or burned to release organic material in the form of inhalable material.

Lavender vaporizes at 260° F. Tobacco vaporizes between 257° F. to over 392° F. Green tea vaporizes between about 175° C. to 185° C. Valerian vaporizes at about 235° C. Chamomile used to aid in the relief of anxiety vaporizes at about 380° F. Peppermint vaporizes at about 255° F. Peppermint is also known to ease symptoms of allergies and asthma, in addition to alleviating some of the side effects that come along with the common cold or a sinus infection. *Cannabis*, has a range at which it can be heated to release different cannabinoids as vapor without burning the organic material from below 200 F to about 430 F.

*Cannabis* contains over 421 different chemical compounds, including over 60 cannabinoids. Cannabinoid plant chemistry is far more complex than that of pure THC, and different effects may be expected due to the presence of additional cannabinoids and other chemicals. Eighteen different classes of chemicals, including nitrogenous compounds, amino acids, hydrocarbons, carbohydrates, terpenes, and simple and fatty acids, contribute to the known pharmacological properties of cannabis.

Heating a cartridge configured to contain organic plant material and/or infused oils on a carrier material may, in some instances, overheat at least portions thereof and therefore combust, overheat or otherwise release unwanted substance which may include carcinogens and chemicals into the vapor. The CDC (Center for Disease Control) has acknowledged that emissions created from heated not combusted tobacco products generally contain lower levels of harmful ingredients than the smoke from regular cigarettes. However, that does not mean heated tobacco products are safe.

It is therefore a desideratum to have a device, method and or system wherein such heating without combustion is better managed.

DESCRIPTION

Disclosed herein are aspects of a portable heat without burning system to produce inhalable vapor from a by heating a consumable containing tobacco (or other plant material) without combustion. The consumable has one or more frangible sections and during insertion into a receivor heating chamber/cartridge guide a protrusion deforms the frangible section(s) of the consumable and forms air gap(s) in a separation between the deformed section of the consumable and the chamber's inner wall. A controller receiving temperature sensor(s) input controls the supply of power to heating elements in thermal communication with the chamber thereby heating the consumable.

Disclosed herein are aspects of a portable heat without burning system to produce inhalable vapor from a plant material in a disposable consumables including heating a disposable consumable without combustion by inserting a removable substantially hollow disposable consumable cartridge (with an intake end and a containment end holding at least organic plant material) into an interface fluidly connected to a cartridge guide. Said cartridge guide having an inner and an outer wall. Upon insertion into one of the interface (which is fluidly connect to the cartridge guide) and the cartridge guide, at least one actuator protruding into the insertion pathway deforms a frangible section of the cartridge. Each deformed portion of the cartridge is separated by an air gaps from the inner wall of the cartridge guide and forming an air gap between the deformed portion and the inner wall of the cartridge guide. Placing at least one heating element at least partially around the cartridge guide. Placing at least one temperature sensor in thermal communication with the cartridge guide. Controlling heating of the containment end with a controller in signal communication with a power supply, at least one temperature sensor and the at least one heating elements. During use the controller controls heating without burning of the material in the containment end.

In some instances the controller communicates status of the device with the user via at least vibration. In some instances the controller in response to temperature sensor input controls heating of the containment. In some instances the one or more actuators aligns the cartridge within the cartridge guide in a predefined orientation. In some instances the containment end is a combination of materials including at least paper and foil. In some instances the heating of the containment end is by conduction. In some instances the heating of the containment end is by induction. In some instances the material is tobacco.

Disclosed herein are aspects of a portable heat without burning system to produce inhalable vapor from disposable consumables including inserting a removable substantially hollow cartridge with an intake end and a containment end holding at least organic plant material into an interface fluidly connected to a cartridge guide having an inner and an outer wall, deforming a portion of the cartridge when inserting it into one of the interface and cartridge guide past an one or more actuators. Each deformed portion of the cartridge is separated by an air gaps from the inner wall of the cartridge guide and forming an air gap between the deformed portion and the inner wall of the cartridge guide. Placing at least one heating element at least partially around the cartridge guide. Placing at least one temperature sensor in thermal communication with the cartridge guide. Controlling heating of the containment end with a controller in signal communication with a power supply, at least one temperature sensor and the at least one heating elements. During use the controller controls heating without burning of the material in the containment end and air in the gap.

Disclosed herein are aspects of a portable heat without burning system to produce inhalable vapor from disposable consumable including a case configured to contain at least a cartridge guide, heating element, power supply and controller. The controller is in signal communication with at least a temperature sensor, at least one heating element, a power supply, and a communication means. At least one protruding mechanical alignment or actuator within the cartridge guide, an interface to the cartridge guide or between the two. Said interface and cartridge guide are fluidly connected. The cartridge guide and interface are configured receive a cartridge. The actuator is configured to deform a frangible section of cartridge during the insertion. The at least one heating element is affixed cross-sectionally around a portion of the cartridge guide. The at least one temperature sensors in thermal communication with the cartridge guide and, the controller is configured to control power supplied to the at least one heating element whereby the material in the containment end will heat without combusting. A disposable consumable cartridge reversibly fits into the cartridge guide. The cartridge has one or more frangible sections, an inhalation end and a containment end containing at least tobacco. Upon insertion into at least one of the interface and the cartridge guide the protruding mechanical actuator will deform said frangible section(s). In some instances the protruding mechanical alignment actuator is configured to position the disposable consumable cartridge in a predefined orientation within the cartridge guide.

Disclosed herein are aspects of a portable heat without burning system to produce inhalable vapor from disposable consumables including a case configured to contain at least a cartridge guide, heating element, power supply and controller. A controller in signal communication with at least a temperature sensor, at least one heating element, a power supply, and communication means. An elongated cartridge having an inhalation end and a containment end configured to be partially inserted into a cartridge guide. A mechanical alignment configured to deform a portion of the cartridge and position the cartridge in a predefined orientation within the cartridge guide forming at least one gap between a portion of the cartridge and the cartridge guide and the containment end including metal foil and configured to hold material. The at least one heating element is affixed cross-sectionally around a portion of the cartridge guide. The at least one temperature sensors in thermal communication with the cartridge guide; and, the controller is configured to control power to the at least one heating element and wherein the controller controls heating of the containment end when the cartridge is inside the cartridge guide.

In some instances the mechanical alignment is one of a protruding mechanical actuator and a key hole. In some instances the containment end is a combination of materials including at least paper and foil. In some instances the material is tobacco.

FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIGS. 1-4D illustrate aspects of cartridges, actuators and heating devices for a heating without combustion system and method.

Figures 1, 2, 3, 4A, 4B, 4C, 4D:
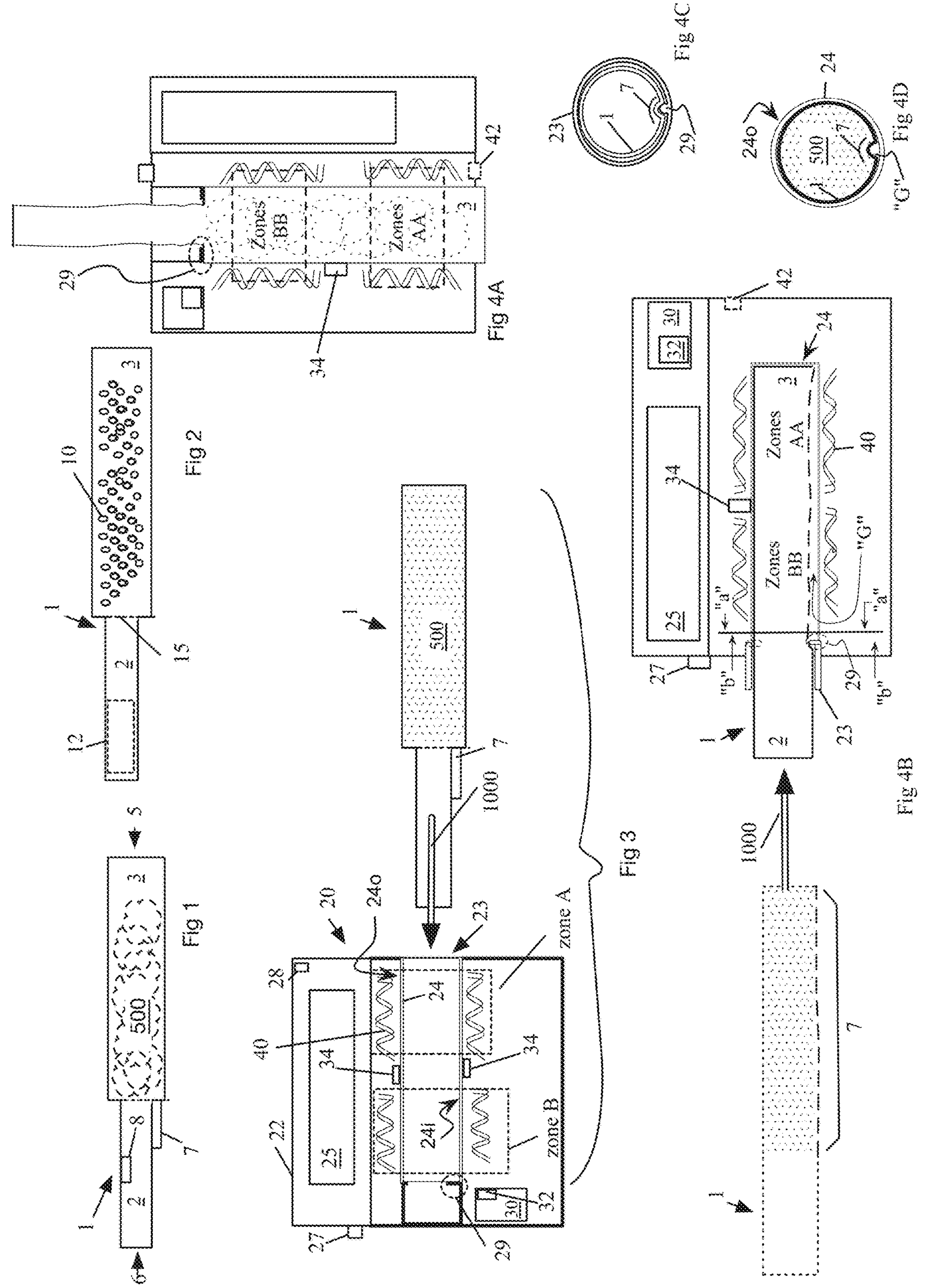

All descriptions and callouts in the Figures and all content therein are hereby incorporated by this reference as if fully set forth herein.

FURTHER DESCRIPTION

Combustion free heating for a disposable consumable cartridge which is an elongated tube formed of one or more materials which wrap at least a material to vaporize therein. The material to vaporize includes tobacco (or other plant material) to release smoke free vapors which is consider healthier for consumer than combustion and burning of substances such as tobacco. Disclosed herein are aspect of the use of a disposable consumable cartridge having one or more deformable frangible sections and said consumable cartridge wrapping may contain metal foil regions. Said consumable with material therein is insertable into a controlled heating device. During or before insertion of the consumable into a receivor, an actuator deforms the frangible section(s) of the consumable. In some instance the deformation forms an air gap in a separation between at least the frangible deformed section of the consumable and the receivor inner wall. A controller receiving temperature sensor(s) input controls the supply of power to heating elements thereby heating the consumable and air in the gap.

It is appreciated by those skilled in the art that some of the circuits, components, controllers, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs*), time-to-frequency conversations, frequency-to-time conversions, database mapping, signal processing steps, coding, modulations, demodulations, etc. The controller devices and smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

Heating logic turns on/off heating elements forming zones to heat different sections of the cartridge at different times. In some instances the cartridge has limited orientations of insertion to hold it fixed in the heater and unable to rotate about its axis. In some instances the cartridge is marked with a frangible identifier which is broken on insertion to prevent reuse of a spent cartridge. In some instances the cartridge is marked with an identifier that is stored in memory to turn off the heater if the cartridge has already been used.

FIGS. 1, 2, 3 and 4A and 4B show cartridge 1 with two ends, the first end 2 is an inhalation (or intake) end or portion and the second end 3 is a containment (or heating) end or portion. The cartridge is generally tubular and holds material to be heated. During use air pass into the open front 5 to the containment end 3, through the cartridge and then into the inhalation end 2 and finally out through the open back 6. Optionally, a frangible section 7 may be formed on the cartridge whereby it will be deformed during use with a heater. In some instances the deformation may render the cartridge finished an unable to be reused. In some instance an ID 8 which verifies cartridges non-used status may be added to the cartridge. In some instances small perforations 10 may be formed in the containment end 3 to effectuate better heat flow from heating elements. In some instances a filter or flavor filter 12 is placed within the inhalation end 2 whereby vapor inhaled passes. The filter can remove some materials from the vapor and the flavor filter adds an inhalable flavor to the vapor. A flow through divider 15 such as a screen or coarse filter which allows vapors to pass through may be positioned in the cartridge between the containment and inhalation ends. Organic matter 500 is placed within the containment 3 for use of the cartridge. The organic material is a material containing oils or resins (such as, hemp, tobacco and cannabis) which can be released via heating.

The cartridge is formed of an inexpensive disposable material which will not burn or release toxic or harmful fumes at temperatures that are reached by the heater in the device. In generally for many organic materials the temperature of vaporization will be between 320 F to 450 F. The cartridge may be scarred by the heating process as it is disposable. Paper, fibers such as cotton and hemp, metal, foil, plastic, resins, thermoplastics, ceramics, ceramic doped paper, glass, PEEK, and combination thereof may be suitable material for some or all of the cartridge. The cartridge may be made of different materials for different regions. For example the containment portion 3 is subjected to the greatest heat. The material or materials therein must be suitable to transfer a sufficient portion of the heat applied to its surface through its wall and into the containment portion to thereby cause vapor of the organic material 500 without burning. In some instances the interior annular wall of the containment portion has one or more conductive regions facing the inside.

FIGS. 3 and 4D illustrate aspects of a consumable heating with combustion device. During use the cartridge 1 inserted into a heater 20 via the pathway of arrow 1000. This also may be referred to as a pass-through cartridge device as the cartridge guide is open at both end. The example of the passing the cartridge into the heater is not a limitation and those of ordinary skill in the art will recognize that a non-pass-through configuration is within the scope of this disclosure which is also described in reference to FIGS. 9A-9C). The heater 20 has a case 22 with an interface fluidly connected to a receivor 24 (also referred to as a cartridge guide). The interface 23 opens into a cartridge guide 24. The cartridge guide (receivor) is a channel within the case that is open to allow passage of the cartridge therein. The guide refers to a region within the case that is roughly the cross-sectional circumference or perimeter around the cartridge. Accordingly, if heating elements are placed in the area of the cartridge guide, they would be adjacent to at least a portion of the cartridge. Within the case is a battery 25. A cartridge identification reader 26 may also be added to the case. The identification reader is a sensor that verifies a cartridge is new and has not been previously used. It may determine that a heat indicator has previously been heated, it may determine that a code which is ablated by the heat of use his or is not present thereby interrupting or allowing heating. It may read a code and verify that the code has not been used during a prescribed interval. An on/off switch 27 is shown, and battery may have a charging I/O 28. The case may have a mechanical or electrical mechanical actuator 29 which protrudes in the insertion path of a cartridge and deforms a cartridges frangible section 7 upon insertion. The actuator positioned in or near one of the interface 23 and a receivor 24 (also referred to as a cartridge guide) which are fluidly connected. The deformation of said frangible section may actuate a sensor. Actuation is a communication of the actuator 29 to the controller whereby the controller recognizes the state of the cartridge as "new" and not used and thereby allows electrical current to flow to the heating elements. Within the case is a controller 30. The controller is a microprocessor which may have memory 32 and which controls certain operations of the vaporizer device. Operations may include one or more of time, date, location, security code, on/off, sequence of heating, temperature, indicator display of the heater, battery charging, battery management, battery state of charge indication, communication via illumination, sound, vibration and the like with the user and cartridge verification. Those of ordinary skill in the art will recognize that blue tooth or other wireless or wired connection to a smart phone or computer may also be used to perform some of the controller functions and that would be within the scope of this disclosure. One or more temperature sensors 34 are within the case and near the receivor 24.

The case 22 contains one or more heating elements 40. One or more heater vents 42 may be provided. Both heating elements are shown those of ordinary skill in the art will understand that what is disclosed is one or more zones. In some instance only a single heating zone may be provided, in other instances multiple zones may be utilized and such is within the scope of this disclosure.

In some exemplary implementations a multi-zone heater is disclosed it may have heat zone "A" and "B". A cartridge, during use, will have corresponding zones "AA"" to "BB" which align generally with the heat zones.

During use one or more zones may be turned on to supply heat, via heating elements, to heat organic material 500 and release vapor. Sequencing the zones for heating is advantageous in that it can reduce power consumption by splitting up the total area to heat into the zones so that less power per zone is needed then power to heat all zones at the same time. Sequencing the zones for heating is also advantageous in that it can release vapor from a discreet amount of organic material at one time thereby leaving less heated or unheated areas of organic material with the same cartridge for a next use. Sequential heating also reduces overheating and supports continuous use while reducing overheating. Overheating, for at least cannabis results in singeing the material which is commonly referred to as a "popcorn" taste.

FIGS. 4B to 4D illustrates aspects of a non-pass-through embodiment of the cartridge heating without combustion device shown in FIG. 4A. During use the cartridge 1 is inserted into a heater 20 via the pathway of arrow 1000. The heater 20 has a case 22 with an interface fluidly connected to a receivor 24 (also referred to as a cartridge guide) open at one end and in fluid communication with the interface 23. The receiver acts as a heating chamber. The cartridge guide (receivor) accepts insertion of the cartridge therein. The cartridge guide refers to a region within the case that is roughly the cross-sectional circumference or perimeter around the cartridge. Accordingly, if heating elements are placed in the area of the cartridge guide, they would be adjacent to at least a portion of the cartridge. Within the case is a protruding mechanical actuator associated with one of the interface and the cartridge guide. The actuator deforms a cartridge's frangible section 7 upon insertion through an interface 23 into a receivor 24 (also referred to as a cartridge guide), the deformation(s) form gaps "G" of air between portions of the cartridge guide and the cartridge. Within the case is a controller 30. The controller is a microprocessor which may have memory 32 and which controls certain operations of the vaporizer device. Operations may include one or more of time, date, location, security code, on/off, sequence of heating, temperature, indicator display of the heater, battery charging, battery management, battery state of charge indication, communication via illumination, sound, vibration and the like with the user. Those of ordinary skill in the art will recognize that blue tooth or other wireless or wired connection to a smart phone or computer may also be used to perform some of the controller functions and that would be within the scope of this disclosure. One or more temperature sensors 34 are within the case and near the receivor 24. FIG. 4C is a cross section along line "a"-"a" of FIG. 4B, a frangible section of the cartridge is deformed via passing over the protruding actuator into the cartridge guide 24. FIG. 4D is a cross section along line "b"-"b" of FIG. 4B, the frangible section of the cartridge is separated from the cartridge guide inner wall to having an indented area in cross section forming an air gap "G" between the receivor wall and indented frangible section.

During use one or more zones may be turned on to supply heat, via heating elements, to heat organic material 500 and release vapor. Areas of the cartridge in contact with the inner wall 24*i* of the cartridge guide will heat by direct heat transfer from the outer wall 24*o* to the cartridge, areas of air near the frangible sections deformed by protrusions will heat up and be drawn through the cartridge upon inhalation. Sequencing the zones for heating is advantageous in that it can reduce power consumption by splitting up the total area to heat into the zones so that less power per zone is needed then power to heat all zones at the same time. Sequencing the zones for heating is also advantageous in that it can release vapor from a discreet amount of organic material at one time thereby leaving less heated or unheated areas of organic material with the same cartridge for a next use. Sequential heating also reduces overheating and supports continuous use while reducing overheating. Overheating, for at least cannabis results in singeing the material which is commonly referred to as a "popcorn" taste.

Figure 5B:
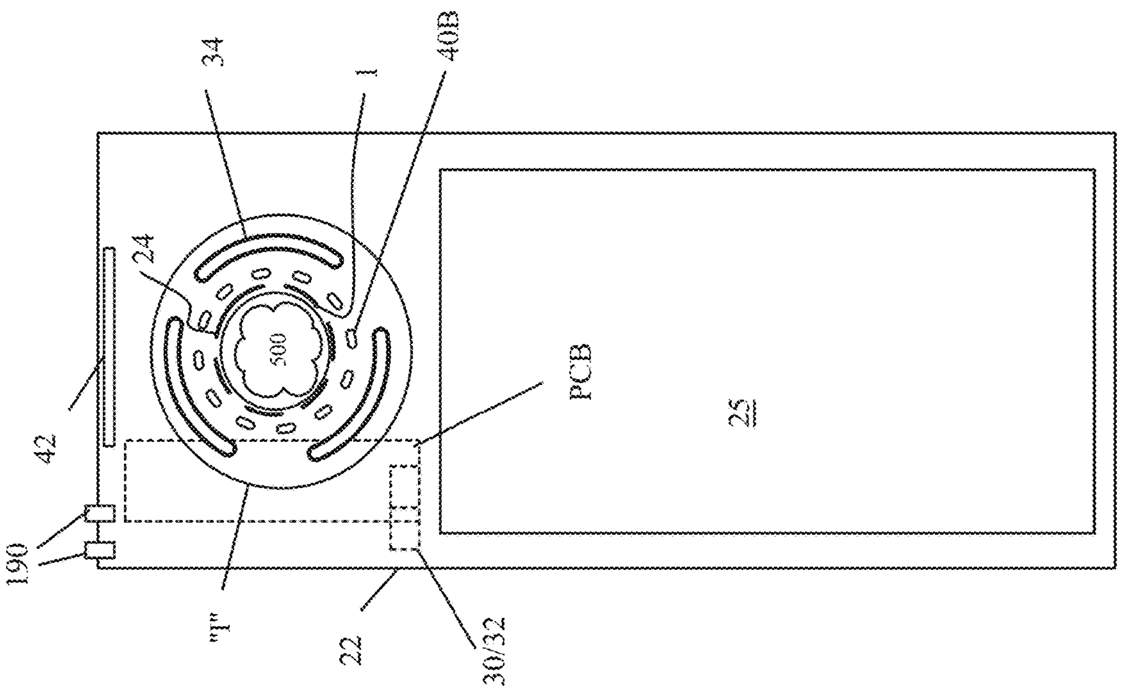
FIGS. 5A& 5B illustrate aspects of cartridges and multizone heating.
Figure 5A:
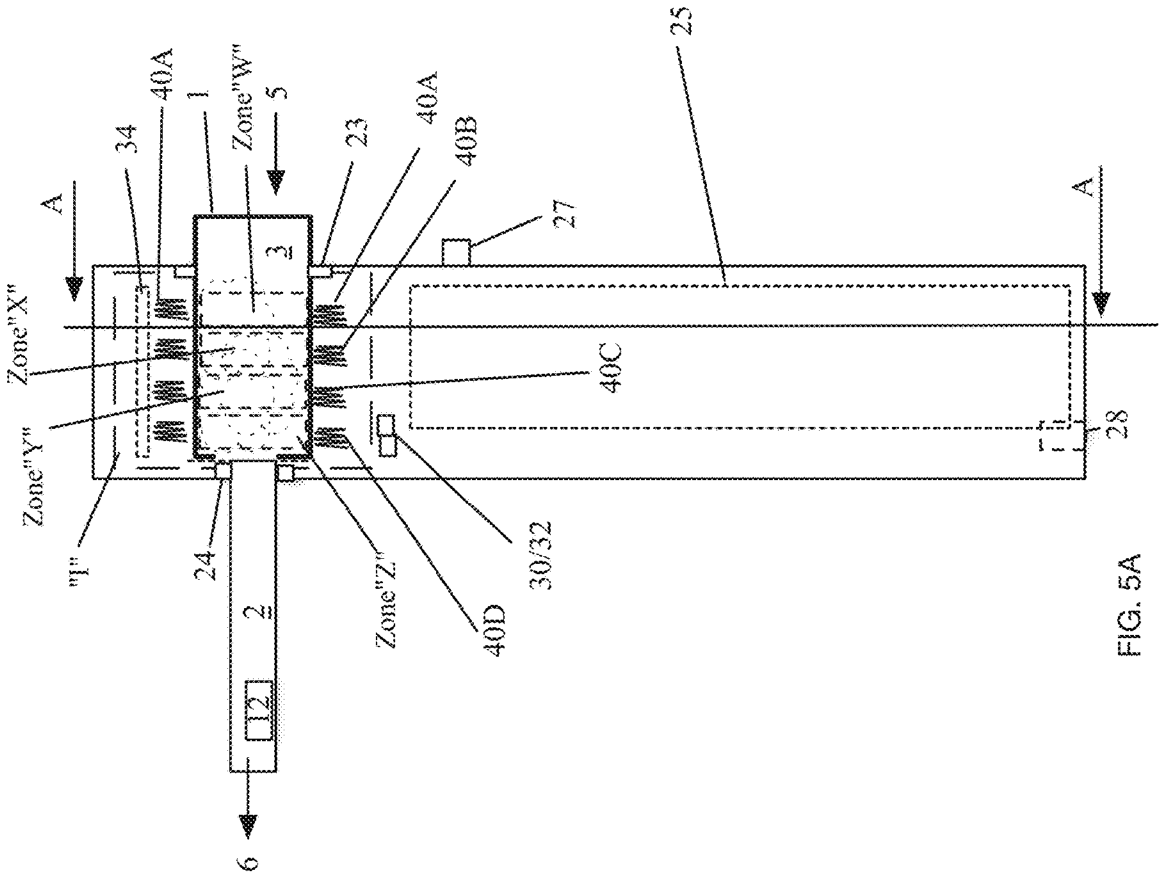

FIGS. 5A-5B show an alternative package for the systems shown in FIGS. 1-4. This disclosure heats the cartridge 1 akin to slicing a sausage. Each of zones "W"-"Z" are sequentially heated. The controller keeps count of which was the last zone to be heated. The controller keeps count of when all zones have been heated and can stop the heat cycle until a spent cartridge is removed and replaced with a new cartridge. It also adds indicators 190. Indicators are shown as LED lights. However, indicators include haptics such as vibration or chirps such as sounds from a microprocessor. Indicators are used to communicate status of the device to a user. The communication may be "on" state, state of the heating, battery state, a spent cartridge, a spent zone that has been heated, the remaining zones to heat, a need for recharge, or remaining zones to heat. Heating elements 40A-4D are in thermal contact with heat zones "W"-"Z". One or more temperature sensors 34 are within the case and near the receivor 24, each temperature sensor is associate with at least one of a heat zone and heating element. Insulation "I" may be placed around the heater elements inside the case 22. The heater elements may optionally be connected to a PCB board via conductive wires and the controller and memory may also be on that board. The battery 25 is connected via the on/off switch 27 to the controller 30 to supply power to the heat elements. The controller 30 may be connected to separate digital memory 32. The controller initiates each heater element (40A-40D) sequentially to spend each zone and then use the next. When the sequence is complete the device stops heating until reset. All aspects of systems to verify, authenticate and assure that a used cartridge is not reloaded into the device, as described herein with respect to other exemplars are hereby incorporated into this description with respect to FIGS. 5A and 5B.

The cartridge mates with the receivor 24 which places it adjacent to heating elements. The cartridge heating portion (containment) should be constructed so that it does not burn, or combust at exposure temperatures below at least one of 400 degrees F., 410 degrees F., 211

0 degrees F., 430 degrees F., and 440 degrees F. The failure to burn or combust occurring after at least one of 30 seconds exposure, 1 minute exposure, 2 minute exposure. The failure to burn or combust occurring after at three least 30 second exposures. The failure to burn or combust occurring after at three least 1 minute exposures. The failure to burn or combust occurring after at least four 1 minute's exposures. The failure to burn or combust occurring after at five least 1 minute exposures. The failure to burn or combust occurring after at seven least 1 minute exposures. The failure to burn or combust occurring after at eight least 1 minute exposures.

Figure 6B:
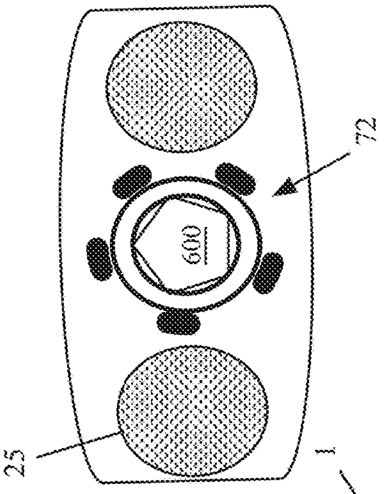
FIGS. 6A-6D illustrate aspects of cartridges, key guides and heating elements.
Figure 6C:
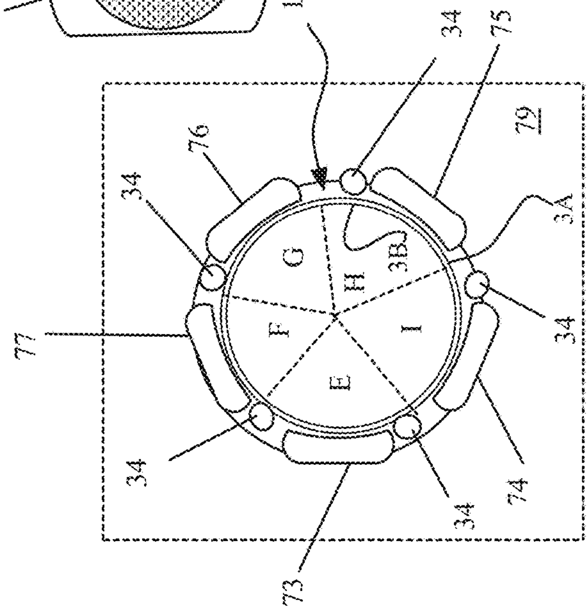
Figure 6D:
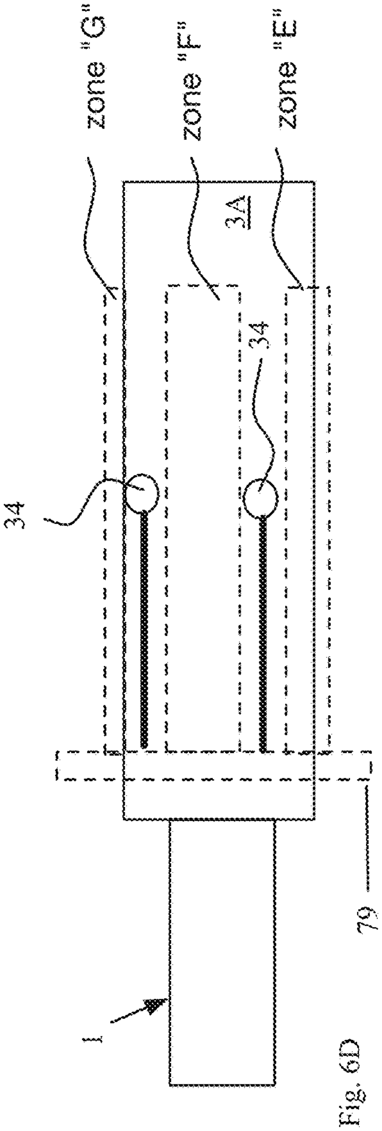
Figure 6A:
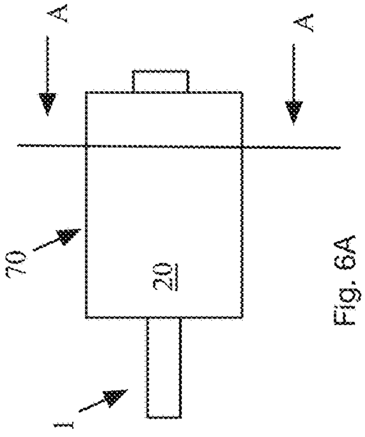

FIGS. 6A-6D shows aspects of another exemplary implementation of the cartridge and heater device. A heater 70 receives a disposable cartridge 1. FIG. 6A is FIGS. 6B and 6C which show view cut away view and a close up view along the line "A-A" of FIG. 6A showing vertical heating zone 72 with the common receivor. The common receivor means a single linear receptacle which may have a partially sealed first end and has an at least partially open second end. FIG. 6C is a view of the aspects of the vertical zone heater 72 within the common receivor showing individual heating elements and temperature sensors 34 associated with heating element aligned with the cartridge 1, each individual element is configured co-axially along the length of the cartridge adjacent to the material, each heating element 73-77 forms a corresponding vertical heat zone "E"-"I" an each heat zone is adjacent to a portion of the cross section of the outer wall 3A of the containment 3 portion of said cartridge along a pre-determined axially length.

The controller initiates each heating element sequentially to activate selected zone(s) and then the next. When the sequence is complete the device stops heating until reset. Accordingly, vertical heat zone "E" is primarily heated by vertical zone heater element 73 and so on. A printed circuit board (PCB) or other support 79 may be used to support the heater elements 73-77 FIG. 6D shows a side view of a cartridge 1 with a representation of vertical heat zones E-G. Temperature sensors are between the heating elements against the outer wall. Temperature sensors are in signal communication with the controller and during use the input from one or more temperature sensors is used to adjust the heating time, the pulse width modulation" (PWM) protocol applied to one or more heating elements to maintain a target temperature.

Figure 7A:
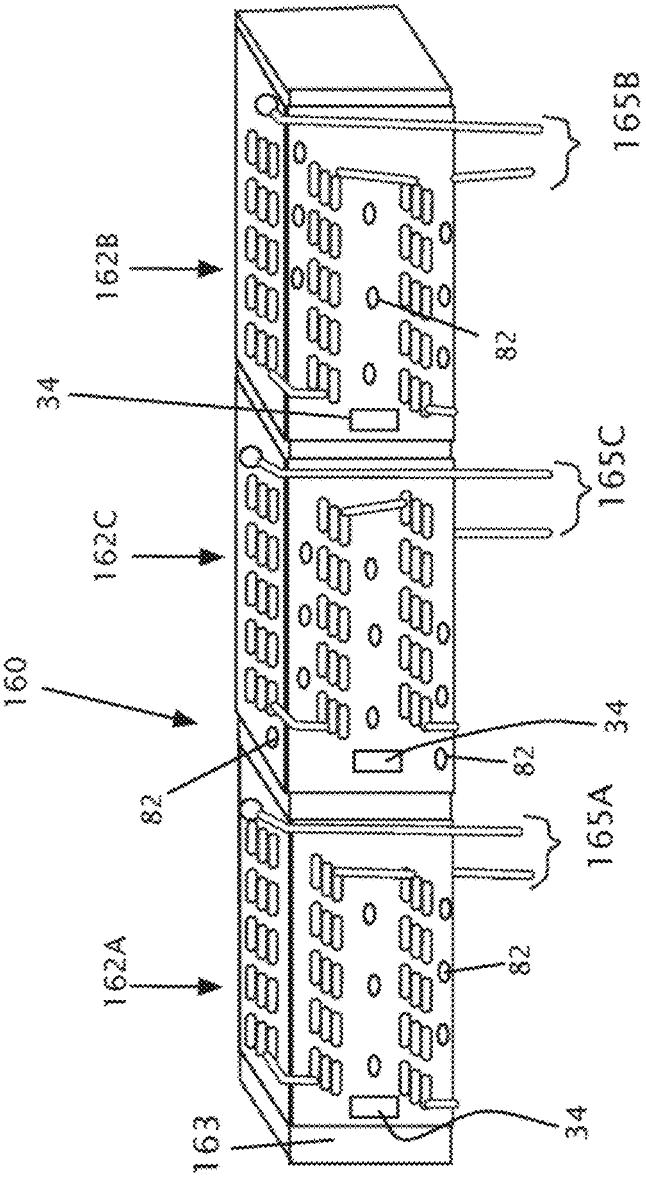
FIGS. 7A & 7B illustrate zoned heating and elements associated therewith.
Figure 7B:
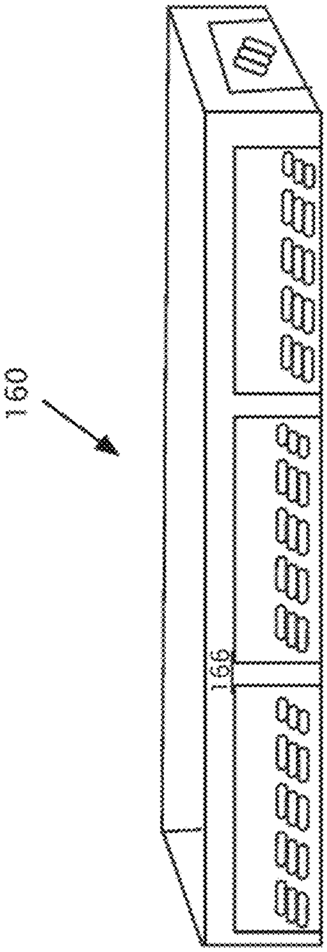

FIGS. 7A-7B is another exemplary of zoned heating with conduction or induction heating of the chamber 160 which receives material. FIGS. 7A-6C illustrate variations on a zoned heating chamber using induction or conduction heater elements in close proximity to the exterior annular wall of the heating chamber. Chamber 160 which is generally elongated, although shown as rectangular those of ordinary skill in the art will recognize that adding a radius to the corners and a draft angle or slope to the walls is within the scope of the disclosure. Air flow into the chamber is through intake vents 82. The zoned heating utilizes separate heating elements 162A-C. The elements are in thermal contact with the annular wall 163 of the chamber. Each heating element has electrical contacts 165A-C which are connected to the controller (not shown) whereby the zone that is being heated is controlled. A heated zone with a heating element receiving electrical power may be referred to as active because it is receiving power and therefore turned on. Temperature s 34 such as thermistors and thermocouples are placed near each zone heater and are electrically connected to the controller (not shown).

The heating elements 162A-C may wrap around the sides 166 of the annular wall. The measurement of heat derived from the temperature sensor data is used by the controller to adjust the electricity provided to an active heating element to target a predefined temperature or range of temperatures.

Figure 8A:
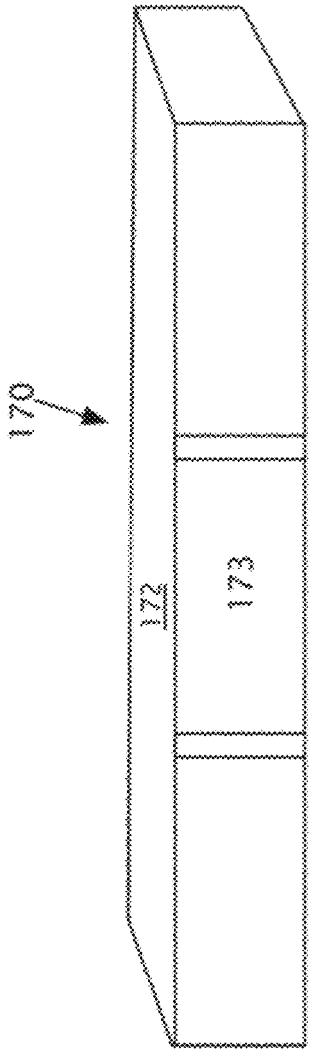
FIGS. 8A-8D illustrate a zoned heating and elements associated therewith.

In FIG. 8A the chamber 170 is generally elongated, although shown as rectangular those of ordinary skill in the art will recognize that adding a radius to the corners and a draft angle or slope to the walls is within the scope of the disclosure. The chamber may be constructed of metal, ceramic, high temperature plastic, it may be metallized plastic formed of glass such as quartz glass or borosilicate. A shaped chamber may have thickened sections which form part of the insulator dividers 35 (which are optional).

Figure 8B:
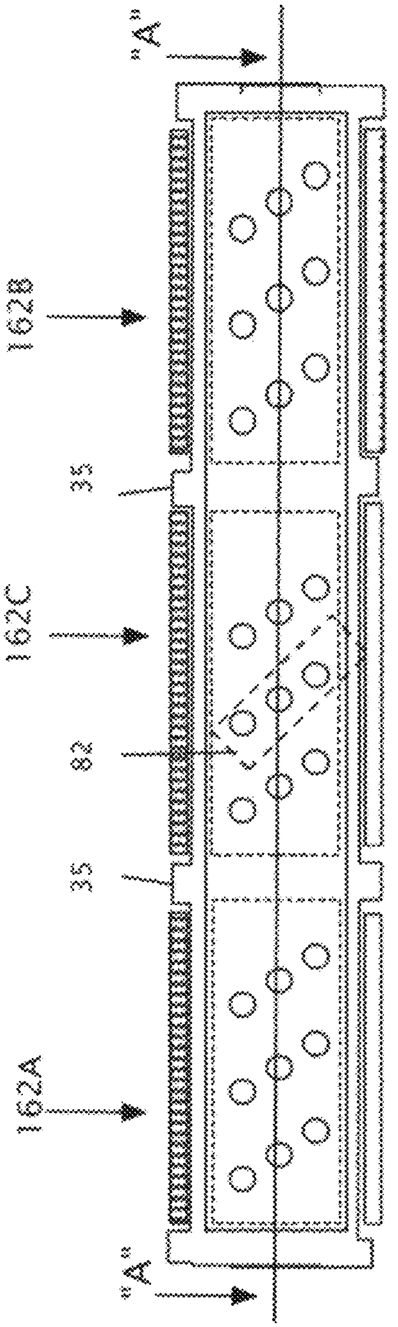
Figure 8C:
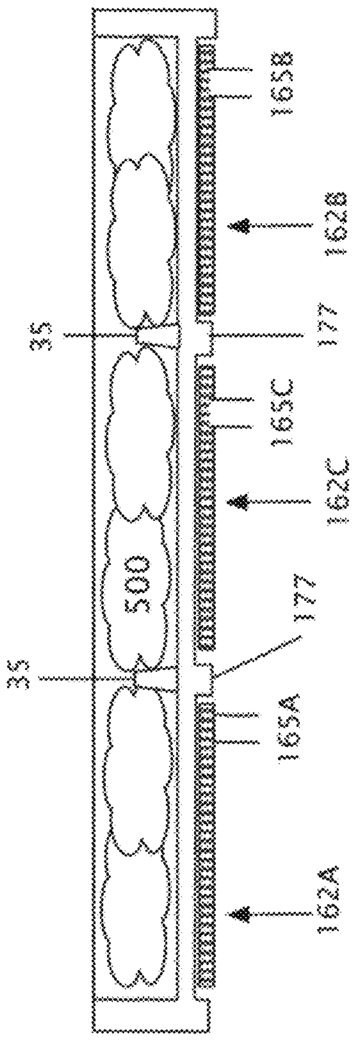
Figure 8D:
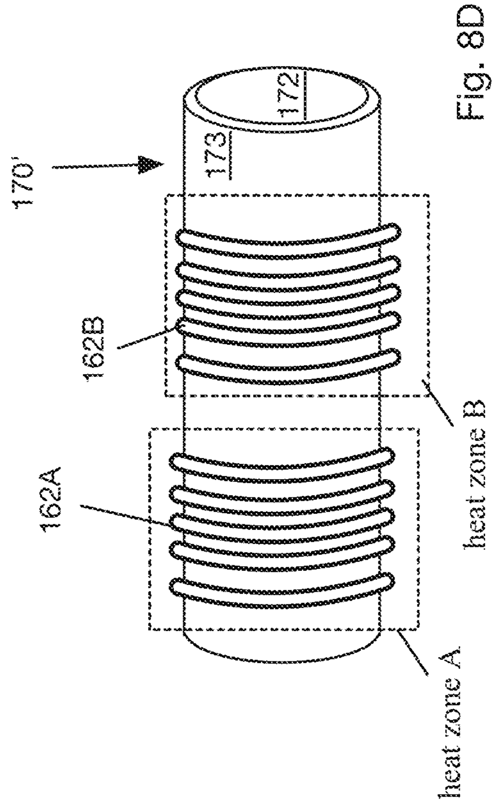

FIG. 8A is a bottom perspective view of the chamber, FIG. 8B is bottom view of the chamber. FIG. 8C is a cut-away view along the line of "A"-"A" of FIG. 8B. Air flows into the chamber 170 through intake vents 82. The zoned heating utilizes separate heating elements 162A-C. The elements are in thermal contact with the inner annular wall 172 of the chamber. Each heating element has electrical contacts 165A-C which are connected to the controller (not shown) whereby the zone that is being heated is turned on and off and the temperature thereby is adjusted. Temperature sensors 34 such as thermistors and thermocouples are placed near each zone heater and are electrically connected to the controller (not shown). The heating elements 162A-C may wrap around the outer side wall 173 of the annular wall. Extended heat sinks or cooling fins 177 may be formed as part of the chamber or affixed thereto to assist with heat management in the chamber and zones. FIG. 8D shows chamber 170' in a tubular form having an inner annular wall 172 and two heating elements 162A and 162B around separate cross-sections of the outer side wall 173 of the chamber.

Figures 9A, 9B, 9C:
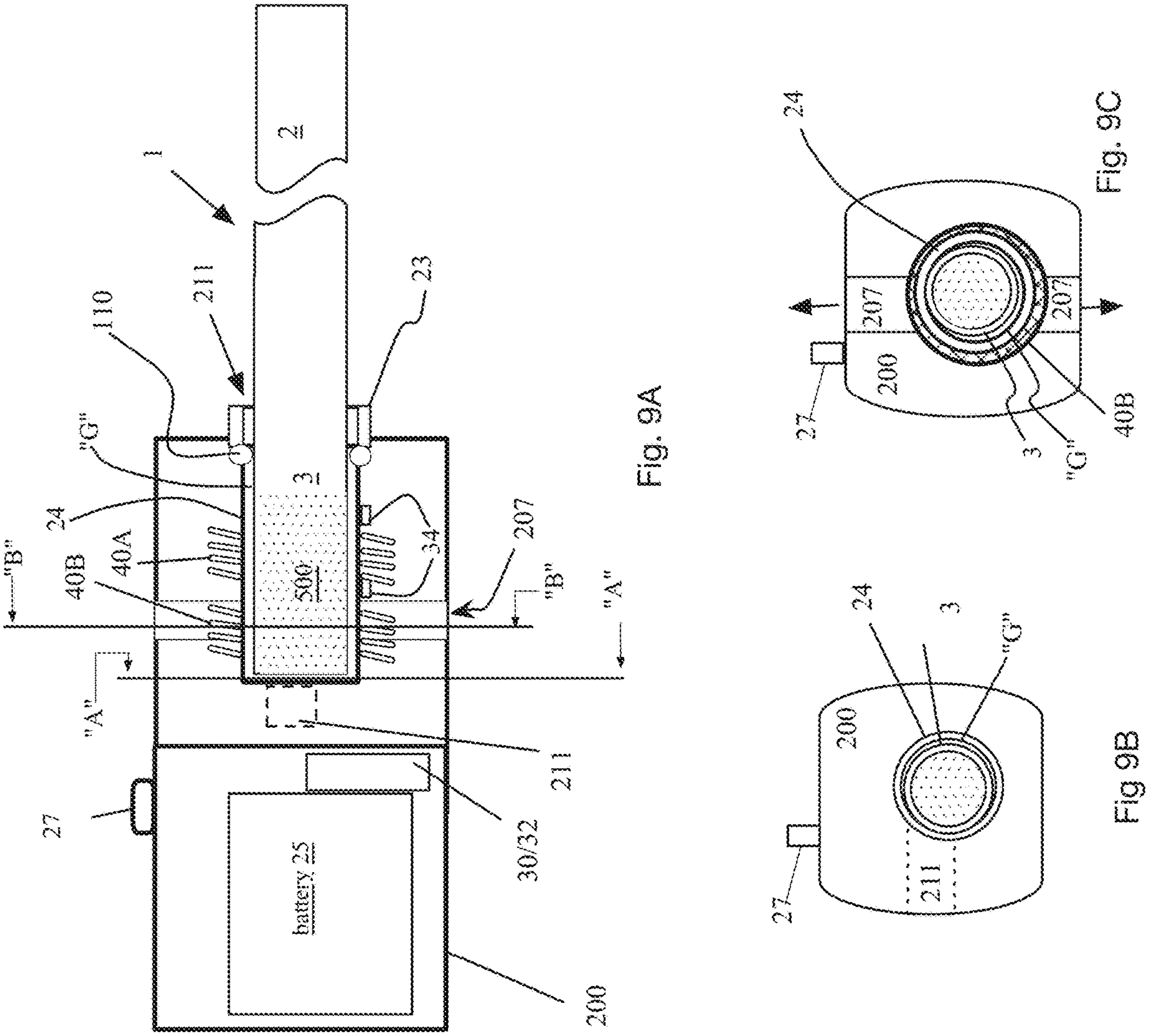
FIGS. 9A-9C illustrate aspects of another cartridge and portable heating system.

FIGS. 9A-9C show a non-pass through cartridge heating system, device and method. A case 200 contains heating elements 40A and 40B. Each heating element forms a Heat Zone (zone A and zone B).

Each heat zone has a corresponding zone (Zone AA and Zone BB) within the cartridge containment metal or foil layer 3B near the heating element. In some instance only a single heating zone may be provided, in other instances multiple zones may be utilized and such is within the scope of this disclosure. Upon heating via a selected heating element the chamber (See FIGS. 8A-8D) configured as a cartridge guide 24 heats up and the corresponding zone heats up in the cartridge. The disposable cartridge 1 is constructed of materials including paper, fiber such as cotton and hemp, metal, foil, plastic, resins, thermoplastics, ceramics, ceramic doped paper, glass, PEEK. The cartridge may be made of different materials for different regions, and the cartridge is removable from the case 200. An interface 23 opens into the cartridge guide 24 (also referred to as a receivor) which is also within the case. The cartridge fits through interface 23 whereby the containment end 3 (which is also referred to as distal end) of the cartridge is removably placed into the cartridge guide 24 and the inhalation end 2 (also referred to as the proximal end) is extended from the case. Seals 110 between a portion of the receivor and cartridge are shown. An air gap "G" is formed between a portion of the cartridge and the cartridge guide. One or more heating elements are placed in the area of the cartridge guide, they would be adjacent to at least a portion of the cartridge. An organic material 500 for vaporization is within the distal end near the one or more heater elements 40. The containment end 3 is subjected to the greatest heat. The material or materials of the containment end must be suitable to transfer a sufficient portion of the heat applied to its surface through its wall and into the containment end of the cartridge to thereby cause vapor of the organic material 500 without burning.

Sequencing the heat zones (zone A and zone B) for heating is advantageous in that it can reduce power consumption by splitting up the total area to heat into zones (Zone AA and Zone BB) and when heating them sequentially less power is required for heating one zone then to heat all zones at the same time. Sequencing the zones for heating is also advantageous in that it can release vapor from a discreet amount of organic material at one time thereby leaving less heated or unheated areas of organic material with the same cartridge for a next use. Sequential heating also reduces overheating and supports a continuous inhalation by reducing the overheating which would occur if all heating elements were turned on at the same time.

One or more vents 207 allow the heater to vent from the case. One or more air intake 211 provides a fluid pathway for air to enter the case and be drawn through the cartridge from distal end to proximal end and then out for inhalation. FIG. 9B shows a cut away view of the device along the lone of A-A and FIG. 9C shows a cut-away of the device along the lines of "B-B". FIG. 9D shows a component view of a containment end 3 within a cartridge guide 24 and two heaters 40A and 40B for multizone heating. The cartridge is disposable and constructed of materials including paper, fiber such as cotton and hemp, metal, foil, plastic, resins, thermoplastics, ceramics, ceramic doped paper, glass, PEEK. The cartridge may be made of different materials for different regions. the containment end 3 is subjected to the greatest heat the material or materials it is formed of must be suitable to transfer heat into the containment end to thereby cause vapor of the organic material 500 therein without burning.

Methods disclosed include a controller that manages heating of a zone at a selected exposure temperatures (SET) to vaporize a portion of the material in the containment area in the accordance with one of variable, preselected and fixed times. The heating of all heating elements may also be referred to as a cycle or a heating cycle. When a cycle is over the cycle has timed out. Temperature sensors are utilized to measure when the chamber or subzone has reached a target temperature. If the amount of time a specific heating element is to be heated is reached the heating of that element has timed out. The controller can track, monitor, measure or otherwise count that heating time. In other instances the controller may switch between subzones, preferably using a PWM protocol to supply power to each heating element separately to maintain a temperature at a predetermined range. Selective heating allows the "off" zone to cool while the "on" zone is heating. Said cooling is effective to reduce overheating and/or singeing of material.

In some instances the controller prohibits heating when a zone has already been heated for a predetermined timeframe. In some instances the controller may accept a user over ride to allow reheating of a zone or to heat multiple zones simultaneously.

Figure 10:
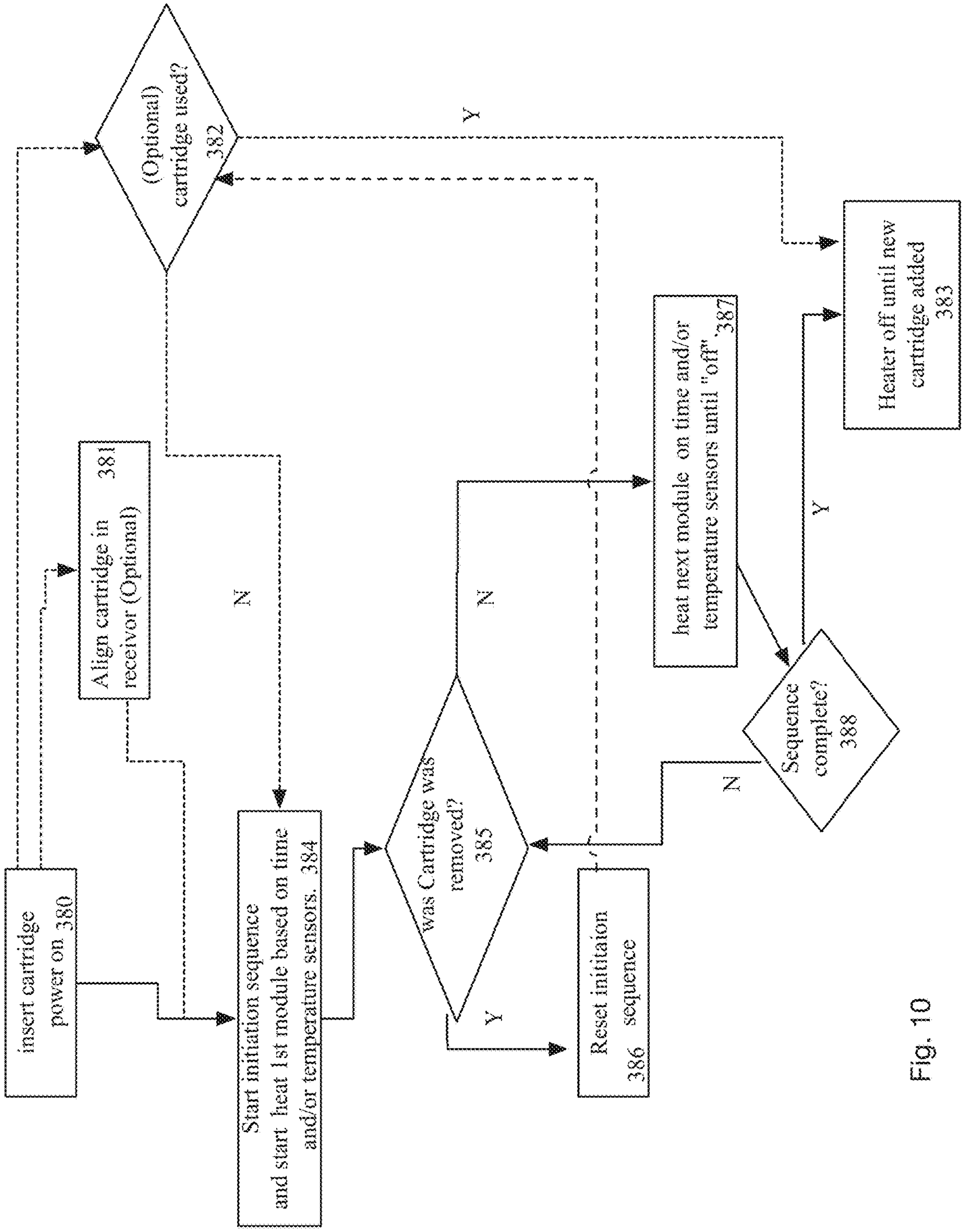
FIG. 10 illustrates aspects of a process for heating a consumable without combustion.

FIG. 10 illustrates aspects of a control sequence and sequence of operation of one or more exemplary implementations disclosed herein. First a cartridge is inserted into a heater unit and the on/off switch is depressed 380. Optionally, a mechanical fixture or electro-mechanical fixture limits the orientation of the cartridge to a predefined orientation inside the receivor 381. Optionally, a sensor collects data on the cartridge to determine if it is used 382. If used 383 keep heater off until a new cartridge is added. If cartridge is not used then start power initiation and heat 1$^{st}$ heating element/module 384 based on at least one of time and/or temperature, until user selects "off" or controller shuts off which may be due to time being completed. Then determine if cartridge has been removed 385. If the cartridge has been removed 386 then rest sequence of operation. If not removed 387 heat next heating element/module until user or controller shuts off. Next determine if sequence of heating is complete 388. If no heat cartridge if it has not been removed 385, else reset 386. If cartridge heating sequence is complete (all heating zones have been heated) then keep heater off until a new cartridge is provided 383.

Figure 11:
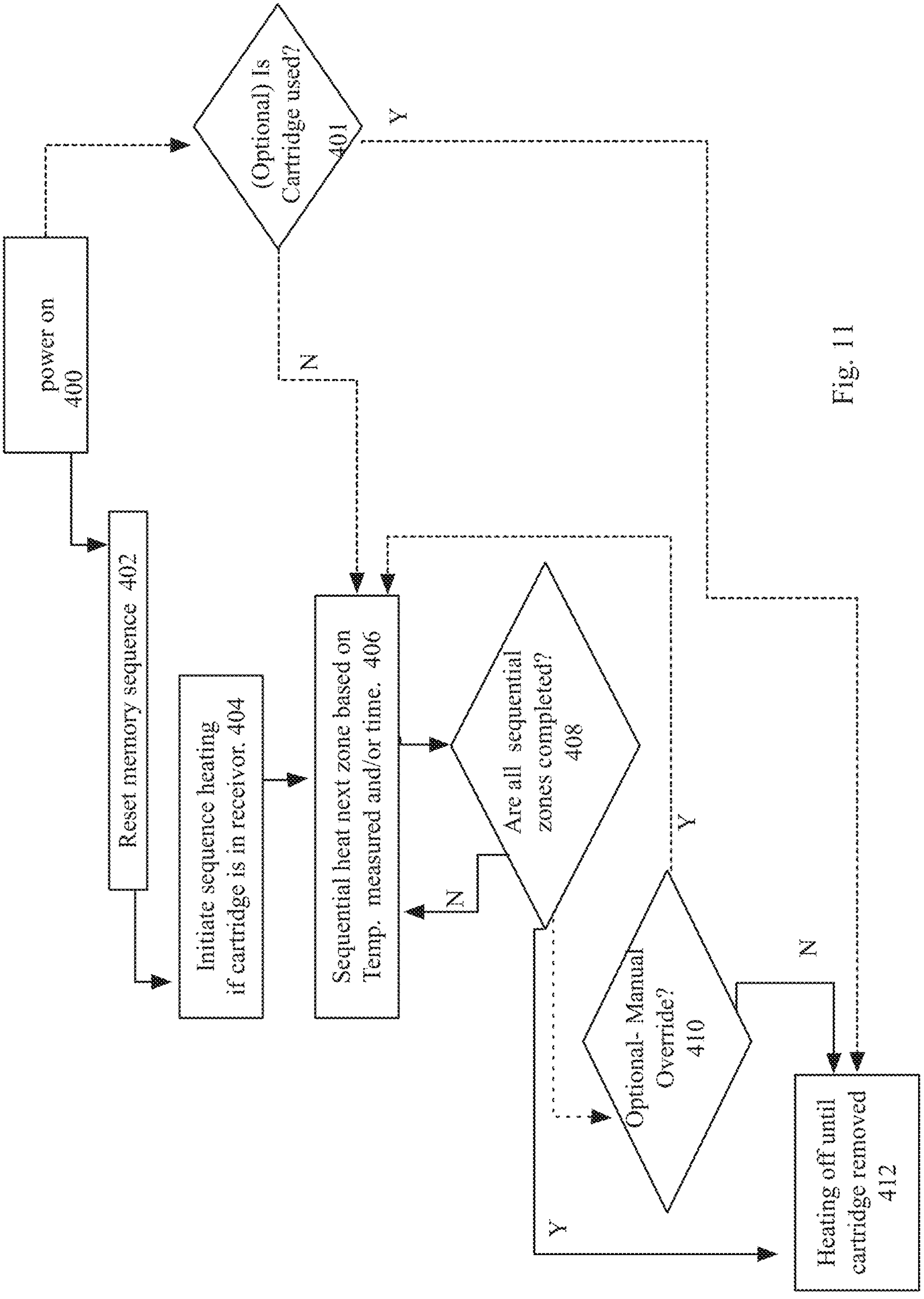
FIG. 11 illustrates aspects of a process for heating a consumable cartridge system.

FIG. 11 illustrates aspects of a control sequence and sequence of operation of one or more exemplary implementations disclosed herein. First power is turned on 400. Optionally the system checks if cartridge in receivor is in the receivor 401. If the cartridge in the receivor is used turn heater off until used cartridge is removed 412. After power on the controller resets memory sequence for sequentially heating back to beginning 402. Next the controller initiates sequential heating of zones if a cartridge is in the receivor 404. The controller, which is configured to control sequential heating, controls the application of power to the selected "on" heating elements until changing to the next heating element in the selected sequence 406, based on at least one of temperature during heating of the zone and time. The controller decides if sequential heating is complete 408. If "no" the controller continues the system's sequential heating 406. If "yes", optionally the controller checks if manual override 410 is selected which continues the sequential heating loop. Otherwise, the controller stops heating any elements until the cartridge is removed 412.

Figure 12:
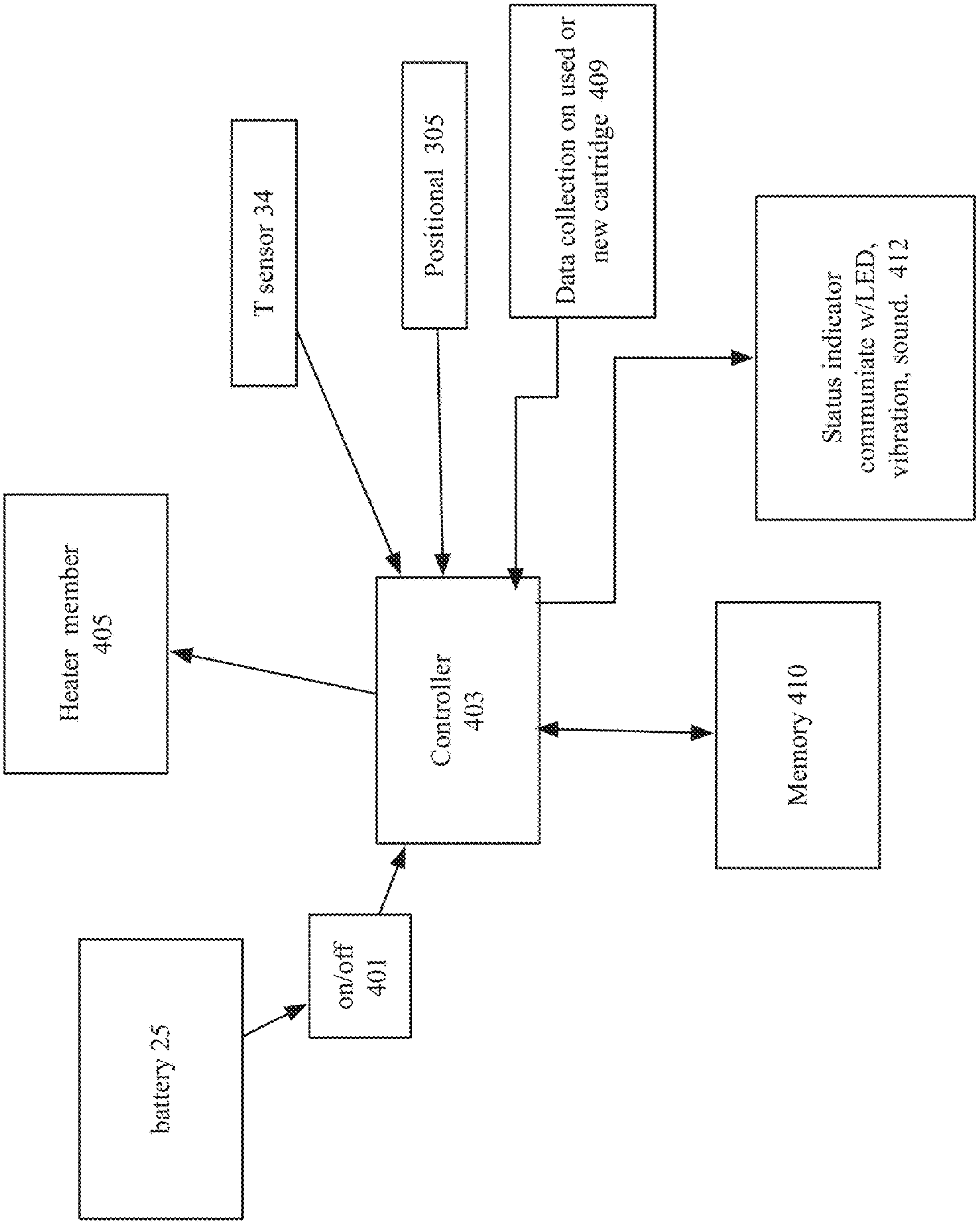
FIG. 12 illustrates aspects of a component view of heat without combustion system control.

FIG. 12 shows aspects of an operational system for the systems and devices disclosed herein. A battery 25 is conductively connected to an on/off switch 401 then a controller 403. The controller 403 receives input from one or more of temperature sensor 34, positional sensor 305, data collection 409 (such as data on cartridge, RFID on cartridge, optical on cartridge) and communicates with Memory 410 optionally to determine status of cartridge—is it new or used? Has it been moved? Have all heating zones been heated sufficiently? The controller also can provide visual or audio feedback to the user via status indicators 412 such as LED lights, also haptics such as vibration or chirps such as sounds from a microprocessor.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method of heating a disposable consumable without combustion, the method comprising:

inserting an elongated disposable cartridge through an interface into a cartridge guide having an inner wall and an outer wall;

wherein the disposable cartridge has a containment end, an intake end for inhalation and one or more frangible sections;

during insertion at least one actuator deforms the at least one frangible section forming an air gap between the inner wall and the deformed sections;

placing at least one heating element at least partially around the cartridge guide;

placing at least one temperature sensor in thermal communication with the cartridge guide;

a controller configured to be in signal communication with the at least one temperature sensor, the at least one heating element and a power supply receives temperature sensor inputs; and, wherein the controller controls heating without burning of organic material in the containment end.

2. The method of heating a disposable consumable without combustion of claim 1 wherein the one or more actuators align the cartridge within the cartridge guide in a predefined orientation.

3. The method of heating a disposable consumable without combustion of claim 2 wherein the cartridge guide is a non pass through guide with at least one open end.

4. The method of heating a disposable consumable without combustion of claim 3 the method further comprising the interface and cartridge guide is within a case.

5. The method of heating a disposable consumable without combustion of claim 4 the method further comprising the controller communicates status of the device with the user via at least vibration.

6. The method of heating a disposable consumable without combustion of claim 4 wherein the controller in response to temperature sensor input controls heating of the cartridge and air in the gap.

7. The method of heating a disposable consumable without combustion of claim 3 wherein the containment end is a combination of materials including at least paper and foil.

8. The method of heating a disposable consumable without combustion of claim 3 wherein the heating of the containment end is by at least conduction.

9. The method of heating a disposable consumable without combustion of claim 3 wherein in the heating of the containment end is by at least induction.

10. The method of heating a disposable consumable without combustion of claim 3 wherein the material is tobacco.

11. A portable heat without burning system to produce inhalable vapor from disposable consumables comprising:

a case configured to contain at least a cartridge guide, heating element, power supply and controller;

a controller in signal communication with at least a temperature sensor, at least one heating element, a power supply, and a communication means;

at least one protruding mechanical alignment within the cartridge guide configured receive a cartridge and to deform a section of cartridge during insertion;

wherein the at least one heating element is affixed cross-sectionally around a portion of the cartridge guide;

wherein the at least one temperature sensors in thermal communication with the cartridge guide;

wherein the controller is configured to control power to the at least one heating element; and, wherein the containment end is a combination of materials including at least paper and foil.

12. The portable heat without burning system to produce inhalable vapor from disposable consumables of claim 11 comprising: a disposable consumable cartridge having one or more frangible sections, an inhalation end and a containment end containing at least tobacco configured to insert in the cartridge guide and deform said frangible section.

13. The portable heat without burning system to produce inhalable vapor from disposable consumables of claim 11 wherein said protruding mechanical alignment is configured to position the disposable consumable cartridge in a predefined orientation within the cartridge guide.

14. The portable heat without burning system to produce inhalable vapor from disposable consumables cartridge of claim 11 wherein the mechanical alignment is an actuator.

15. A method of heating without combustion via a portable device to produce inhalable vapor from disposable consumables cartridge, the method comprising:

turn on power of a portable device having at least one heating element and a receivor configured with protrusion therein which deform a portion of a disposable cartridge;

the controller receives input from least one temperature sensor and is configured to maintain a selected exposure temperatures (SET);

wherein before or after turning on the portable device the disposable consumable is inserted into the receivor;

wherein the controller stops heating and communicates the change via a communication means if the cartridge is withdrawn from the receivor during heating; and, wherein the means of communication is at least one of illumination and vibration.

* * * * *